US006684815B1

(12) United States Patent
Rakoczy

(10) Patent No.: US 6,684,815 B1
(45) Date of Patent: Feb. 3, 2004

(54) FREE-STANDING, PORTABLE SUPPORT SYSTEM STAND FOR DISPENSING LIQUID FOR PETS/ANIMALS

(76) Inventor: Betsie Marshall Davis Brooks Rakoczy, 3700 17th Ave. North, St. Petersburg, FL (US) 33713-4806

( * ) Notice: Subject to any disclaimer, the term of this patent is extended or adjusted under 35 U.S.C. 154(b) by 0 days.

(21) Appl. No.: 10/146,977

(22) Filed: May 16, 2002

(51) Int. Cl.[7] ............................................... A01K 7/00
(52) U.S. Cl. ......................................... 119/72; 119/77
(58) Field of Search .......................... 119/72, 77, 477, 119/464, 51.5; 215/395; 248/103, 125.3, 311.3, 146

(56) References Cited

U.S. PATENT DOCUMENTS

| RE12,140 E | * | 4/1903 | Stahmer ................ 248/125.3 |
| 1,853,314 A | * | 4/1932 | Schacht ..................... 119/72 |
| 1,977,571 A | * | 10/1934 | Brumm ...................... 119/77 |
| 2,575,056 A | * | 11/1951 | Jones ...................... 248/103 |
| 2,760,668 A | * | 8/1956 | Wiederspan et al. ........ 215/395 |
| 2,946,308 A | * | 7/1960 | Harris ..................... 119/477 |
| 3,026,079 A | * | 3/1962 | Stack ................... 248/125.3 |
| 3,298,648 A | * | 1/1967 | Sepanski .................. 248/103 |
| 3,589,338 A | * | 6/1971 | Lovitz ..................... 119/77 |
| 3,776,195 A | * | 12/1973 | Willinger ................ 119/72.5 |
| 4,009,686 A | * | 3/1977 | Gilchrist ................. 119/464 |
| 4,150,806 A | * | 4/1979 | Dziuk ..................... 248/154 |
| 4,205,629 A | * | 6/1980 | Wix ...................... 119/51.5 |
| 4,541,596 A | * | 9/1985 | Price .................... 248/125.8 |
| 4,616,795 A | * | 10/1986 | Bender .................... 248/103 |
| 4,807,567 A | * | 2/1989 | Atchley .................. 119/477 |
| 4,818,135 A | * | 4/1989 | Desjardins ................ 248/413 |
| 5,040,756 A | * | 8/1991 | Via Cava .................. 248/103 |
| 5,245,951 A | * | 9/1993 | Nicholson ............... 119/72.5 |
| 5,301,634 A | * | 4/1994 | Ho ........................ 119/477 |
| 5,681,019 A | * | 10/1997 | Boyce .................... 248/103 |
| 5,924,659 A | * | 7/1999 | Babcock .................. 248/146 |
| 5,934,222 A | * | 8/1999 | Hwang ..................... 119/72 |
| 6,293,226 B1 | * | 9/2001 | Hwang ..................... 119/72 |
| 6,390,022 B1 | * | 5/2002 | Eichler et al. ............ 119/72 |
| 2002/0070234 A1 | * | 6/2002 | Sunnarborg ............... 222/129 |
| 2002/0088405 A1 | * | 7/2002 | Ho ......................... 119/72 |

FOREIGN PATENT DOCUMENTS

DE                3320326 A1   * 12/1984   ........... A01K/7/00

* cited by examiner

Primary Examiner—Peter M. Poon
Assistant Examiner—Joan M. Olszewski
(74) Attorney, Agent, or Firm—Edward P. Dutkiewicz

(57) ABSTRACT

A free standing, portable support system stand for a liquid dispensing bottle having a dispensing apparatus being angularly disposed from the body, the dispensing apparatus having a tube with a pet/animal activated mechanism, a support base having a supplemental lower plate and a vertical member, the lower edge of the vertical member being coupled to the horizontal rectangular plate. A bottle retaining brace includes a horizontal resting plate coupled to the vertical member of the support base. The resting plate has a receiving end with a first recess with an annular recess. The receiving end of the resting plate has a semilunar recess adjacent to an exposed edge, such that both the first recess and the annular recess coincide with the semilunar recess. The bottle retaining brace has a horizontal support member coupled to the vertical member of the support base at a position superior to the resting plate.

8 Claims, 4 Drawing Sheets

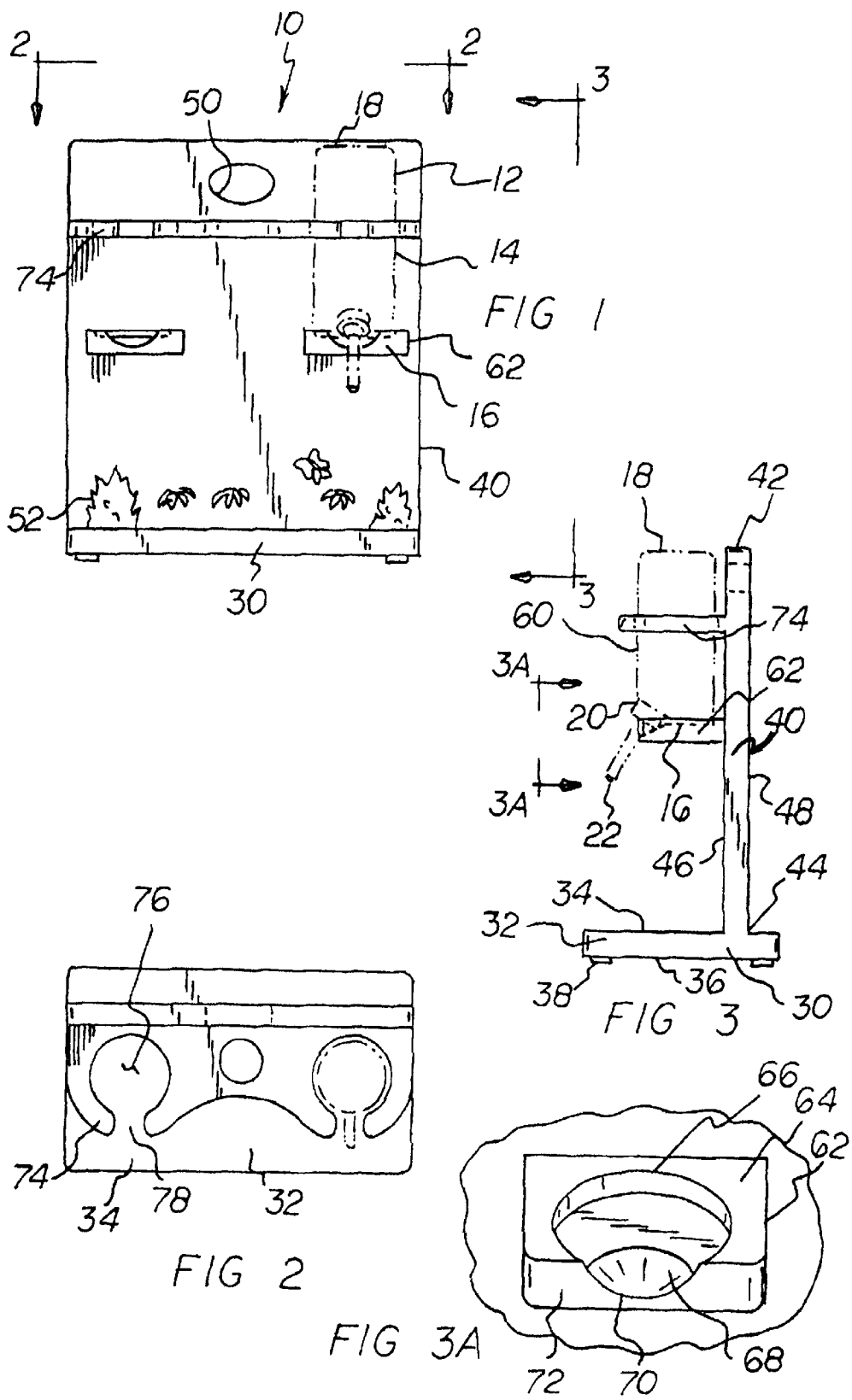

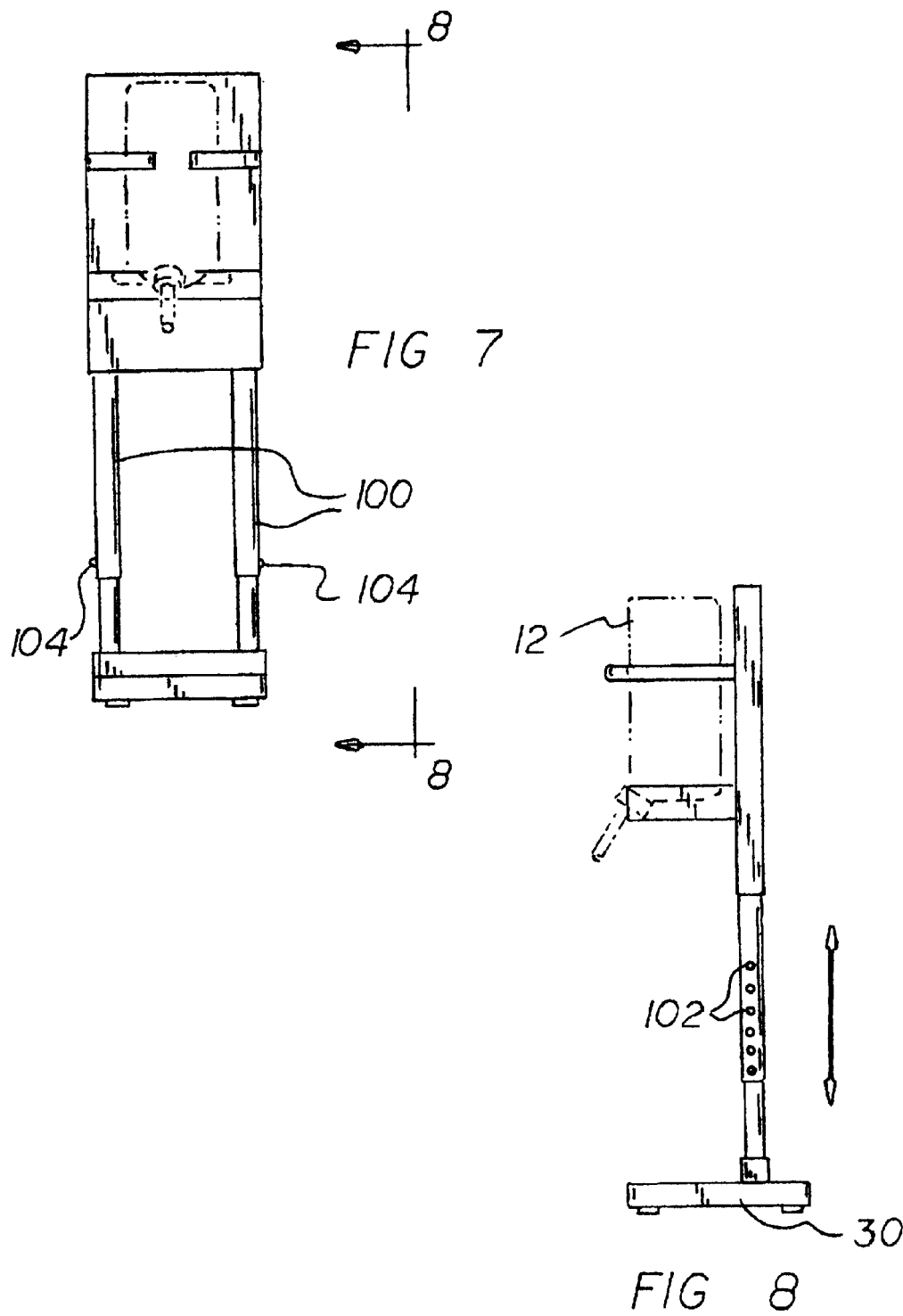

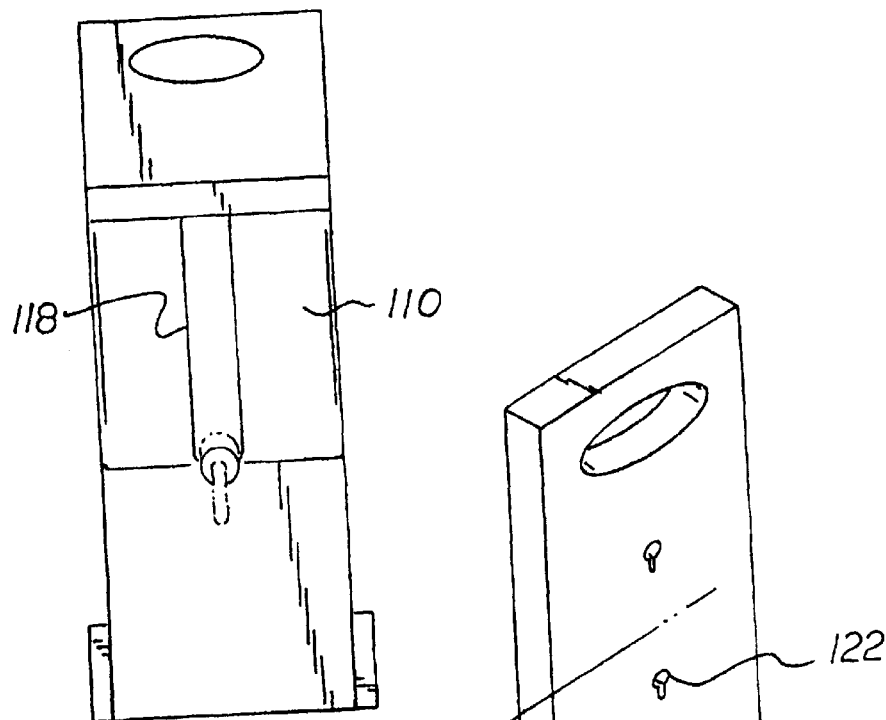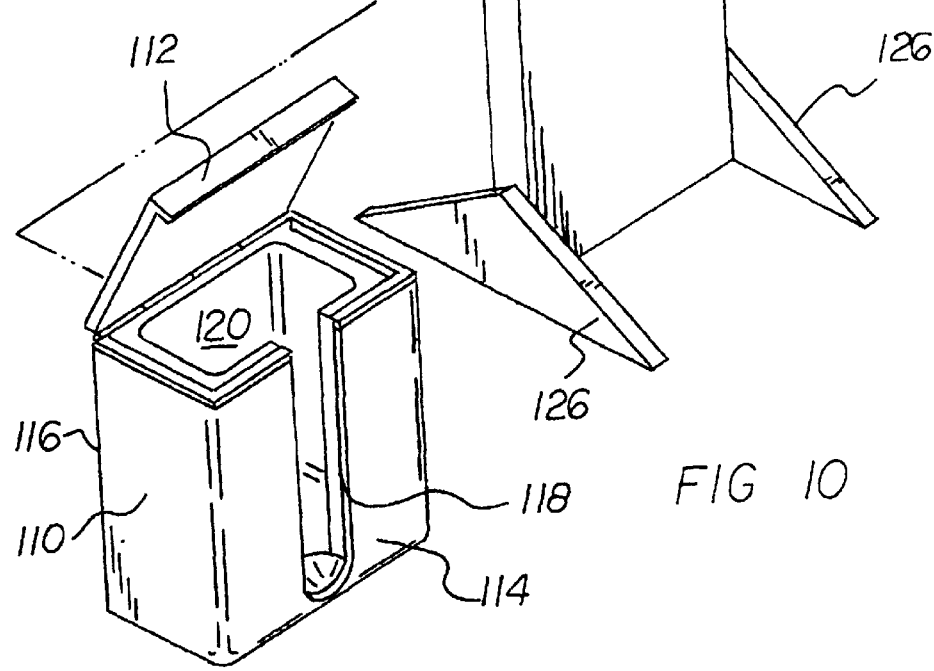

FREE-STANDING, PORTABLE SUPPORT SYSTEM STAND FOR DISPENSING LIQUID FOR PETS/ANIMALS

BACKGROUND OF THE INVENTION

1. Field of the Invention

The present invention relates to a free standing, portable support system stand for dispensing liquid for pets/animals and more particularly pertains to neatly, conveniently, and safely dispensing liquid to pets/animals.

2. Description of the Prior Art

The use of pet/animal watering systems is known in the prior art. More specifically, pet/animal watering systems previously devised and utilized for the purpose of dispensing liquids to pets/animals are known to consist basically of familiar, expected, and obvious structural configurations, notwithstanding the myriad of designs encompassed by the crowded prior art which has been developed for the fulfillment of countless objectives and requirements.

By way of example, U.S. Pat. No. D374,109 to Lillelund et al discloses a pet feeding station. U.S. Pat. No. 5,207,182 to Lorenzana discloses an animal watering apparatus. U.S. Pat. No. 5,636,592 to Wechsler discloses a portable device for feeding animals. U.S. Pat. No. 5,301,634 to Ho discloses an animal feeder having a mounting device. U.S. Pat. No. 3,776,195 to Willinger discloses a feed-bottle. U.S. Pat. No. 2,391,264 to Nickelson discloses a nursing bottle holder.

While these devices fulfill their respective, particular objectives and requirements, the aforementioned patents do not describe a free standing, portable support system stand for liquid for pets that allows neatly and conveniently dispensing liquid to pets/animals.

In this respect, the free standing, portable support system stand for liquid for pets/animals according to the present invention substantially departs from the conventional concepts and designs of the prior art, and in doing so provides an apparatus primarily developed for the purpose that it be free standing, easily portable, attractive, unique and that it allow for neatly and conveniently dispensing liquid to pets/animals.

Therefore, it can be appreciated that there exists a continuing need for a new and improved free standing, portable support system stand for liquid for pets which can be free standing, easily portable, attractive, unique and allow for neatly and conveniently dispensing liquid to pets/animals. In this regard, the present invention substantially fulfills this need.

SUMMARY OF THE INVENTION

In view of the foregoing disadvantages inherent in the known types of pet/animal watering systems now present in the prior art, the present invention provides an improved free standing, portable support system stand for liquid for dispensing liquid to pets/animals that is free standing, easily portable, attractive, unique and that allows for neatly, conveniently and safely dispensing liquid to pets/animals. As such, the general purpose of the present invention, which will be described subsequently in greater detail, is to provide a new and improved support system for dispensing liquid to pets/animals and method which has all the advantages of the prior art and none of the disadvantages.

To attain this, the present invention essentially comprises a support for a liquid dispensing bottle. The bottle has a body portion adapted to be a reservoir for a liquid with a first end and a second end. The first end has a screwably coupled dispensing apparatus being angularly disposed from the body. The dispensing apparatus has a tube with a pet/animal activated mechanism adapted to release a portion of the retained liquid upon activation thereof. Next provided is a support base. The support base has a lower horizontal rectangular supplemental plate with a first face and a second face. The second face has four pads in corners of the horizontal rectangular plate. The support base also has a vertical member. The vertical member has an upper edge, a lower edge, an inner face and an outer face. The lower edge is perpendicularly coupled to the first face of the horizontal rectangular plate. The horizontal supplemental plate may be coupled to the vertical member by any of a plurality of known techniques. Adjacent to the upper edge of the vertical member is a handle aperture. The support base is adapted to have various decorative indicia thereon.

A bottle retaining brace is provided. The brace includes a horizontal resting plate coupled to the inner face of the vertical member of the support base. The resting plate has a receiving end with a recess. Within the recess is an annular recess. The receiving end of the resting plate also has a semilunar recess adjacent to an exposed edge. In this manner both the recess and the annular recess coincide with the semilunar recess allowing the first end of the dispensing bottle to reside within the resting plate to preclude lateral movement and with the dispensing apparatus passing through the annular recess. The bottle retaining brace further has a horizontal support member coupled to the inner face of the vertical member of the support base at a position superior to the resting plate. The support member has an aperture adapted to receive the bottle and also has a slot to facilitate the removal from and placement of the bottle.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved free standing, portable support system stand for dispensing liquid for pets/animals which has all of the advantages of the prior art pet/animal watering systems and none of the disadvantages.

It is another object of the present invention to provide a new and improved free standing, portable support system stand for dispensing liquid for pets/animals which may be easily and efficiently manufactured and marketed.

It is further object of the present invention to provide a new and improved free standing, portable support system stand for liquid for pets/animals which is of durable and reliable constructions.

An even further object of the present invention is to provide a new and improved free standing, portable support system stand for dispensing liquid for pets/animals which is susceptible of a low cost of manufacture with regard to both materials and labor, and which accordingly is then susceptible of low prices of sale to the consuming public, thereby making such support system for liquid for pets economically available to the buying public.

Even still another object of the present invention is to provide a free standing, portable support system stand for dispensing liquid for pets/animals that is free standing, easily portable, attractive, unique and that allows for neatly, conveniently and safely dispensing liquid to pets/animals.

Lastly, it is an object of the present invention to provide a new and improved bottle support system STAND for a liquid dispensing bottle having a dispensing apparatus being angularly disposed from the body, the dispensing apparatus having a tube with a pet/animal activated mechanism. The support system has a support base having a supplemental lower plate and a vertical member, the lower edge of the vertical member being coupled to the supplemental lower plate. A bottle retaining brace includes a horizontal resting plate coupled to the vertical member of the support base. The resting plate has a receiving end with a first recess with an annular recess. The receiving end of the resting plate has a semilunar recess adjacent to an exposed edge, such that both the first recess and the annular recess coincide with the semilunar recess. The bottle retaining brace has a horizontal support member coupled to the vertical member of the support base at a position superior to the resting plate.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a front elevational view of the bottle support system constructed in accordance with the principles of the present invention.

FIG. 2 is a plan view taken along line 2—2 of FIG. 1.

FIG. 3 is a side elevational view taken along line 3—3 of FIG. 1.

FIG. 3A is an enlarged front elevational view of the receiving area for the bottle taken along line 3A—3A of FIG. 3.

FIG. 7 is a front elevational view of another alternate embodiment of the invention.

FIG. 8 is a side elevational view of the system shown in FIG. 7 taken along line 8—8 of FIG. 7.

FIG. 9 is a front elevational view of a final alternate embodiment of the invention.

FIG. 10 is an exploded perspective view of the system shown in FIG. 9.

The same reference numerals refer to the same parts throughout the various Figures.

DESCRIPTION OF THE PREFERRED EMBODIMENT

Figure 4:
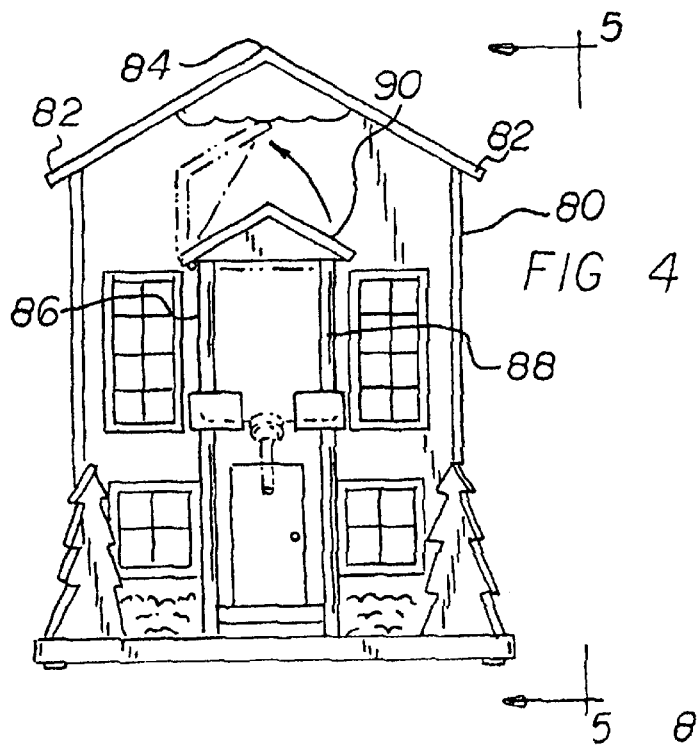
FIG. 4 is a front elevational view of an alternate embodiment of the invention wherein the bottle is hidden by portions of the support system.

With reference now to the drawings, and in particular to FIG. 1 thereof, the preferred embodiment of the new and improved support system for dispensing liquid for pets/animals embodying the principles and concepts of the present invention and generally designated by the reference numeral 10 will be described.

The present invention, the support system for dispensing liquid for pets/animals 10 is comprised of a plurality of components. Such components in their broadest context include a support base and a bottle retaining brace. Such components are individually configured and correlated with respect to each other so as to attain the desired objective.

First provided is a liquid dispensing bottle 12. The bottle has a preferably cylindrical body portion 14 adapted to be a reservoir for a liquid with a first end 16 and a second end 18. The first end has a screwably coupled dispensing apparatus 20 being angularly disposed from the body. The dispensing apparatus has a tube 22 with a pet/animal activated mechanism adapted to release a portion of the retained liquid upon activation thereof.

Next provided is a support base 30. The support base has a lower horizontal rectangular supplemental plate 32 with a first face 34 and a second face 36. The second face has four pads 38 in corners of the horizontal rectangular plate. The support base also has a vertical member 40. The vertical member has an upper edge 42, a lower edge 44, an inner face 46 and an outer face 48. The lower edge is perpendicularly coupled to the first face of the lower horizontal rectangular supplemental plate. The horizontal supplemental plate 32 may be coupled to the vertical member 40 by any of a plurality of known techniques. Adjacent to the upper edge of the vertical member is a handle aperture 50. The vertical member is adapted to have various decorative indicia 52 thereon.

A bottle retaining brace 60 is provided. The brace includes a horizontal resting plate 62 coupled to the inner face of the vertical member of the support base. The resting plate has a receiving end 64 with a recess 66. Within the cylindrical recess is an annular recess 68. The receiving end of the resting plate also has a semilunar recess 70 adjacent to an exposed edge 72. In this manner both the cylindrical recess and the annular recess coincide with the semilunar recess allowing the first end of the dispensing bottle to reside within the resting plate to preclude lateral movement and with the dispensing apparatus passing through the annular recess. The bottle retaining brace further has a horizontal support member 74 coupled to the inner face of the vertical member of the support base at a position superior to the resting plate. The support member has a cylindrical aperture 76 adapted to receive the bottle and also has a slot 78 to facilitate the removal from and placement of the bottle.

When the bottle 12 is upside down for use, the screwably coupled dispensing device 10 and tube 22 are supported in the cylindrical recess 66 of the annular recess 64 of the bottle retaining brace 60. In this manner, lateral movement of the bottle is prevented and stability is provided.

Figure 5:
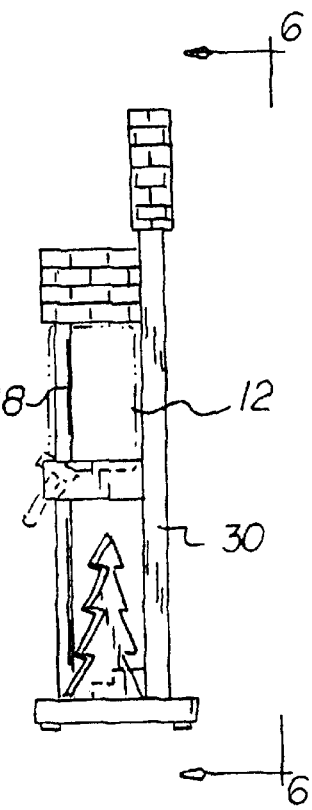
FIG. 5 is a side elevational view taken along line 5—5 of FIG. 4.
Figure 6:
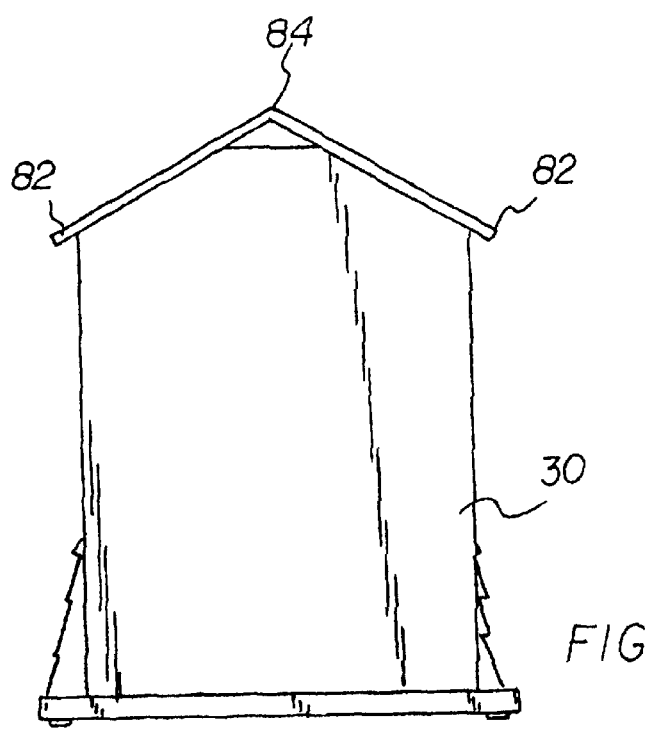
FIG. 6 is a rear elevational view taken along line 6—6 of FIG. 5.

In an alternate embodiment of the invention, the support base is decorated to resemble a house 80. Note FIGS. 4 through 6. In this embodiment, the upper edge of the vertical member has a pair of eaves 82 and a peak 84. The bottle retaining brace has a first wall 86 and a second wall 88. The horizontal support member is pivotally couplable to the first wall. In this manner, the horizontal support member forms a removable roof 90 over the bottle.

A further alternate embodiment is shown in FIG. 7. In this embodiment of the invention, the vertical member of the support base has a pair of telescoping cylinders 100. Each cylinder has a plurality of apertures 102. A spring loaded retention mechanism 104 is associated with the apertures. In this manner, the height of the support system is adjustable, allowing for the growth of the pet/animal or for use with pets/animals of different sizes.

In still another embodiment, shown in FIGS. 9 and 10, the bottle retaining brace is an insulated container 110. The container has a pivotable lid 112, a first face 114 and a second face 116. The first face has a rectangular aperture 118 and the second face has a pair of pins, not shown, adapted to couple with a pair of retaining slots 122 on the vertical member of the support base. The bottle retaining brace is thus removable. In this embodiment, the vertical member 40 has vertically oriented supplemental lower 126 secured to the sides of the vertical support. supplemental lower 126 secured to the sides of the vertical support.

The present invention is not limited to use for dogs and cats. Birds, hamsters, guinea pigs, rabbits, etc. could use it. Also in a larger embodiment larger animals such as horses, cows, some zoo animals such as deers, foxes, wolves, bears etc. could use it. In addition the stand design is not limited to those describe and shown. Materials for manufacture could be woods, metals, clay, plastics, stone, marble, etc. or a combination of materials. The appearance can be changed; it is virtually unlimited. It can be in different forms, shapes, sizes and colors. It could be painted, stained, carved in, graphics applied on molded flat or raised graphics, etc. The invention is a stationary stand to hold a liquid bottle for pets/animals and is an attractive and unique accent to any room in which it is placed. The invention is unique in style, design, shape and function. It is an alternative choice for pet owners who want more than just a bowl of water on the floor. It is pleasing to the eyes, and an attractive accent to any room. The invention allows for the removal and use of water bowls for pets, eliminating the messy drops of water all over the floor and spilled water bowls. It also keeps long haired animals dry. Their hair does not get soaking wet in a water bowl. The water or liquid for the pet is kept clean and uncontaminated; because it is in a bottle, nothing can be accidentally dropped into the water and it is safe from insects.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A bottle support system for holding a water bottle for convenient and neat dispensing of water to a pet comprising, in combination;

a liquid dispensing bottle having a preferably cylindrical body portion adapted to be a reservoir for a liquid with a first end and a second end, the first end having a screwably coupled dispensing apparatus being angularly disposed from the body, the dispensing apparatus having a tube with a pet/animal activated mechanism adapted to release a portion of the retained liquid upon activation thereof;

a support base having a lower horizontal rectangular supplemental plate with a first face and a second face, the second face having four pads in corners of the lower horizontal rectangular supplemental plate, the support base also having a vertical member with an upper edge, lower edge, inner face and outer face, with the lower edge being perpendicularly coupled to the first face of the horizontal rectangular plate, the vertical member having a handle aperture adjacent to the upper edge of the vertical member, the vertical member also being adapted to have various decorative indicia thereon; and a bottle retaining brace including a horizontal resting plate coupled to the inner face of the vertical member of the support base, the resting plate having a receiving end with a cylindrical recess, an annular recess within the cylindrical recess, the receiving end of the resting plate having a semilunar recess adjacent to an exposed edge, such that both the cylindrical recess and the annular recess coincide with the semilunar recess allowing the first end of the dispensing bottle to reside within the resting plate to preclude lateral movement and with the dispensing apparatus passing through the annular recess, the bottle retaining brace having a horizontal support member coupled to the inner face of the vertical member of the support base at a position superior to the resting plate, the support member having a cylindrical aperture adapted to receive the bottle and a slot to facilitate the removal from and placement of the bottle to the dispensing apparatus.

2. A bottle support system stand for a liquid dispensing bottle having a dispensing apparatus being angularly disposed from the body, the dispensing apparatus having a tube with a pet/animal activated mechanism, comprising;

a support base having a supplemental lower plate and a vertical member with an upper edge, lower edge, inner face and outer face, the lower edge of the vertical member being coupled to the supplemental lower plate; and a bottle retaining brace including a horizontal resting plate coupled to the vertical member of the support base, the resting plate having a receiving end with a cylindrical recess, an annular recess within the cylindrical recess, the receiving end of the resting plate having a semilunar recess adjacent to an exposed edge, such that both the cylindrical recess and the annular recess coincide with the semilunar recess, the bottle retaining brace having a horizontal support member coupled to the vertical member of the support base at a position superior to the resting plate.

3. The support system stand as set forth in claim 2 wherein the vertical member of the support base is decorated with indicia and adapted to hold a plurality of bottle retaining braces, the horizontal support member of the bottle retaining brace having an aperture adapted to receive the bottle and further having a slot on an outer edge thereof.

4. The support system stand as set forth in claim 2 wherein the support base is decorated to resemble a house with the upper edge of the vertical member having a pair of eaves and a peak, the bottle retaining brace having a first wall and a second wall, and the horizontal support member being pivotally couplable to the first wall, such that the horizontal support member forms a removable roof over the bottle.

5. The support system stand as set forth in claim 2 wherein the vertical member of the support base has a pair of telescoping cylinders each with a plurality of apertures and a spring loaded retention mechanism associated with the apertures, such that the height of the support system is adjustable.

6. The support system stand as set forth in claim 2 wherein the bottle retaining brace is an insulated container with a pivotable lid, a first face and a second face, the first face having a rectangular aperture and the second face having a pair of pins adapted to couple with a pair of retaining slots on the vertical member of the support base, such that the bottle retaining brace is removable.

7. The support system stand as set forth in claim 2 wherein the supplemental lower plate is rectangular and horizontally oriented.

8. The system as set forth in claim 2 wherein the vertical member has lower vertical supporting plates secured to the sides of the vertical support.

* * * * *